Sept. 14, 1965 J. J. HORAN 3,206,713
LAMP HAVING RESILIENT TERMINALS
Filed March 21, 1962 3 Sheets-Sheet 1

INVENTOR.
JOHN J. HORAN

Sept. 14, 1965    J. J. HORAN    3,206,713
LAMP HAVING RESILIENT TERMINALS
Filed March 21, 1962    3 Sheets-Sheet 2

INVENTOR.
JOHN J. HORAN

Sept. 14, 1965   J. J. HORAN   3,206,713
LAMP HAVING RESILIENT TERMINALS
Filed March 21, 1962   3 Sheets-Sheet 3

INVENTOR.
JOHN J. HORAN

United States Patent Office 3,206,713
Patented Sept. 14, 1965

3,206,713
LAMP HAVING RESILIENT TERMINALS
John J. Horan, 420 Quigley Ave., Willow Grove, Pa.
Filed Mar. 21, 1962, Ser. No. 181,400
16 Claims. (Cl. 339—144)

This application is related to my Patent No. 3,118,717, my Patent No. 3,020,437, and my patent application, Serial No. 181,399, filed Mar. 21, 1962. The nomenclature indicates that the lamps of the above mentioned patents, unlike the lamps of the prior art, have in them the necessary coacting compliance to mate with rigid receptacles.

In the past I have disclosed lamps deriving their principal elasticity from metallic envelopes and skirts. I have shown bases of plastic or other insulative materials in lamps having flexible metallic contacts. I have shown constructions for all of these lamps and for receptacles for use with them that were particularly adapted for polarized construction. The lamps in this application lend themselves equally well to polarized construction at the option of the detail designer under guide lines disclosed herein or easily inferred by practitioners in the art. Most of the embodiments are, however, portrayed as unpolarized in order to emphasize their other characteristics, such as simplicity, low cost, and the dominant use of glass versus the other materials that have been introduced in this series.

The relation to my Patent No. 3,118,717 is intimate, for these embodiments will also furnish lateral compliance to rigid, constricting plates or plate type receptacles by means of contact strips that flex inwardly or radially as the lamp is inserted into the previously disclosed plates. The contacts then flex outwardly under their own stored energy, as insertion passes the high-constriction point, to lock the lamp permanently in place with freshly wiped contacts, so as to assure that the electrical connection will have a low-resistance characteristic.

An object of this invention is to exploit further the basic concepts of the lamp, with particular emphasis on opposed mechanical orientation of the contacts.

An object of this invention is to reduce the number of components of compliant lamps to a minimum and to reduce also their cost and the cost of assembling them into a completed lamp.

An object of this invention is to adapt the principles of the adaptive lamp insofar as possible into embodiments most adaptable to present technology and machinery in the lamp industry.

An object of this invention is to show that related objects of my prior disclosures can be achieved in lamps that are perponderantly of glass construction.

Other objects of prior disclosures will be recognized as objects of this invention. Still other objects and novel features will become apparent in the remainder of the application, in the claims, and in the drawings, in which:

Figure 4:
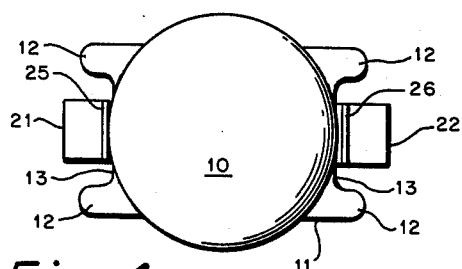
FIG. 4 is a view from above of the lamp of FIG. 1.

Referring now to FIGS. 1, 2, 3, and 4, there is shown a bulb or radiant energy-transmitting enclosure made of vitreous material such as glass and having a pinched-press integral base 11, preferably of generally rectangular base cross-section. Base 11, which may be opaque, preferably has integral ribs 12, 12 projecting alongside and bordering recessed guide surfaces 13, 13. Projecting from the underside of base 11 are two electrical leads or electrically conductive metallic members 14, 15, preferably of round wire and compatible with the glass of base 11, to which they are sealed. Metallic members 14, 15 are each respectively integral with filament support portions 16, 17, across which the radiant energy producing device, filament 18 has been spotwelded. Obviously, support portions 16, 17 alone can represent electrodes in a gas-discharge lamp of similarly portrayable mechanical arrangement, especially since the substance of this invention lies at the opposite, or lower, end of the lamp. The round wires of metallic members 14, 15 are pinched flat just below where they emerge from base 11 to reduce their section modulus as at 19, 20, as also shown in the cutaway lower portion of FIG. 2 and in the bottom view, FIG. 3. Thereby the bent-up members, including contact areas 21, 22, which should not be too soft since a spring temper is most desirable throughout the flattened portion, become elastically yieldable or recoverably compliant toward forces of low values and are capable of much greater amplitudes of resilient flexure than the original round wires would have been and are less likely to overstress the glass.

Smaller wires might have been used within the bulb alternatively and a spotwelded connection might have been made to contact strips outside. Again, in a lightweight lamp, fine, hard wires may be bent up into flexible contacts without flattening. Certain components such as filament 18, metallic members 14, 15, contact areas 21, 22, etc., have been exaggerated somewhat in taper, thickness, etc., in order more clearly to portray their presence and purpose.

Moving upward, the members 19, 20 diverge slightly outwardly, preferably passing quite close to the bottom corners 23, 24 of the guide surfaces 13, 13 of the wall of the base 11, which they flank, so that the possibility of transmitting high forces from contact portions 21, 22 to the points of metallic member emergence is further reduced. Contact areas 21, 22 are at the maximum radial divergence points of the flattened ends of the two current carrying members 16–14–19–21 and 17–15–20–22 and the clearance is greatest under the contact areas. These resilient portions of the members turn radially inward again toward the upper ends of the guide surfaces 13, 13.

Thus, the lamp base 11 is intended for self-resilient admission into an oblong opening in a rigid receptacle having no significant compliance, despite the fact that the lamp body and base press are of glass. The receptacle opening is preferably fitted with a contact adapter such as is shown in my Patent No. 3,118,717. Contact areas 21, 22, which project outwardly beyond ribs 12, 12, spring elastically inward when they meet and are forcibly constricted by the rigid interfering or constricting edges of the oblong opening into which the lamp is to be progressively pushed and thereby automatically engaged by the elastic recovery of the resilient portions in which contact areas are located. When these areas 21, 22 pass the edge of maximum constriction by the receptacle they spring out due to stored energy and grip the receptacle against shoulder 27, FIG. 2, an insertion stop seen best in FIG. 2.

Figure 1A:
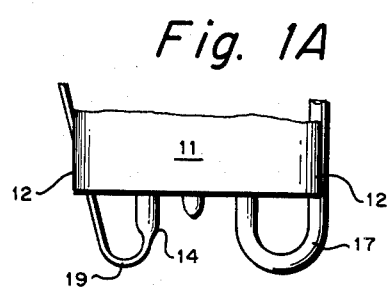
FIG. 1A is a fragmentary elevation showing an alternative construction for a component of FIG. 1.
Figure 1:
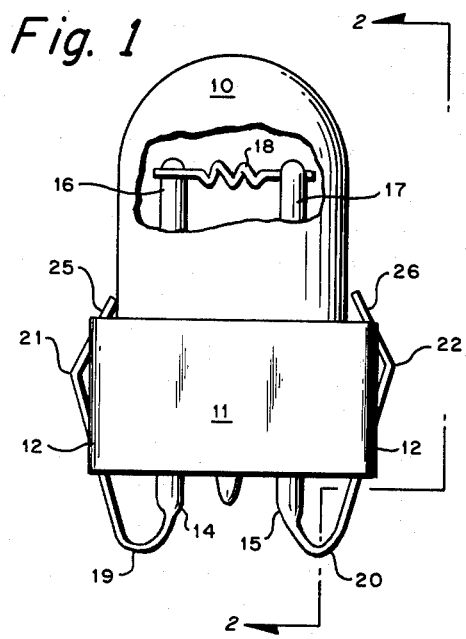
FIG. 1 is an elevation of a lamp in accordance with this invention.
Figure 2:
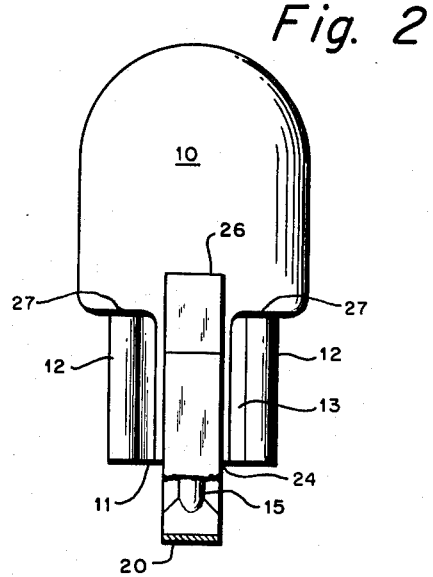
FIG. 2 is an elevation at right angles to the plane of FIG. 1, one of the electrodes being partially cut away.
Figure 3:
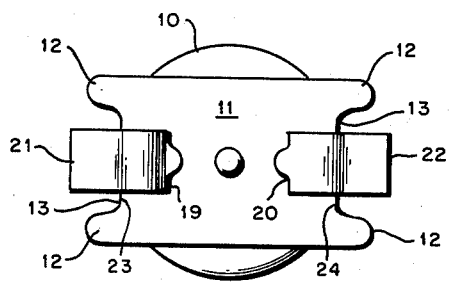
FIG. 3 is a view from below of the lamp of FIG. 1.

Now, as between the tip 25 on the left side and tip 26 on the right side of FIG. 1, there is a difference, they being alternatives. It should be noted that, when the lamp is engaged in an opening, the shoulders or insertion stops 27, FIG. 2, at the bottom of the cylindrical portion of the lamp (or of a conical portion as in other embodiments) will serve as stops against the upper surface of the receptacle so that the lamp cannot enter therethrough so far as to carry contact areas 21, 22 out of engagement with mating surfaces in the receptacle, even though such mating surfaces or contacts in a plate-type recepacle are likely to be shallow.

Assuming then that the lamp is being pushed into a thin-edged opening, it will be apparent that more resistance would be given to entry therein by the contact portion 21 of the left side than by contact portion 22 at the right. This is because the tip 25 of the contact portion 21 is resting against the glass; thus, it is supported top and bottom, where the tip 26 at the right has clearance between itself and the glass. Therefore, tip 26 takes constricting loads—up to the point of its bottoming against the glass—as a beam that is cantilevered from the lower end and is necessarily softer in its reaction. Thus, the tip 26 will, if the material is the same and the thickness the same, accept more constriction than will the tip 25 at the left. Either construction may be meritorious, it being obvious that the terminal 21 on the left could be squeezed thinner or have a lower Young's modulus, and thereby reduce its insertion and removal forces to values comparable with those of the construction at the right. Both versions would be alternatives and probably would not be used in the same lamp. Either version will show a peak withdrawal force at 21, 22.

It will also be obvious that, without departing from the spirit of this invention, members 14, 15 might be permitted to emerge from an elliptical base or near opposite corners of a square base. Again obviously, the ribs 12, 12 might have been eliminated. The diameter of the bulb could optionally be greater than the long dimension of the base or smaller than the width across the flats of the base. In the last event another form of insertion stop means would have to be incorporated, this time in the base itself.

Referring now to FIG. 1A, this lower portion of a lamp is shown to be similar to the bottom portion of FIG. 1 except as regards the metallic member 17 at the right. This metal wire continues from inside the bulb out through the base press 11 and around the bend at 17 to a vertical position without change of section. Thus, this member is not expected to flex like the similarly placed 15–20–22–26 of FIG. 1. Therefore, the left-hand metallic member of FIG. 1A (which is identical with 14–19–21–25 of FIG. 1) will have to flex sufficiently for both contacts when this alternative arrangement of the right-hand assembly is used. It will be seen that the right-hand member of FIG. 1A, instead of being vertical, could be tapered first outwardly and then inwardly. While it would then still not contribute to the contact flexing of this invention, the lamp would probably be somewhat more secure than that shown in FIG. 1A, and would exhibit less tendency to become accidentally disengaged. The embodiment of FIG. 1 is, of course, to be preferred.

Figure 1B:
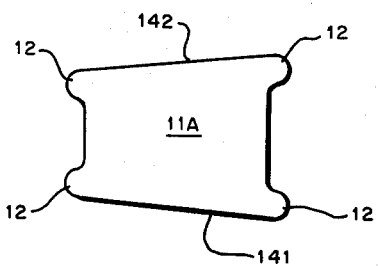
FIG. 1B is a sketch showing an alternative outline form for the base of the lamp of FIG. 1.

The base of the lamps can be inserted in either of two orientations in a receptacle that is similarly symmetrically shaped about its transverse axes. Referring now to FIG. 1B, however, this is an outline sketch, normal to the vertical axis, of a base which will be polarized, that is, which will be insertable into a matching receptacle in only one direction, because its width at the right is greater than at the left.

Figure 5:
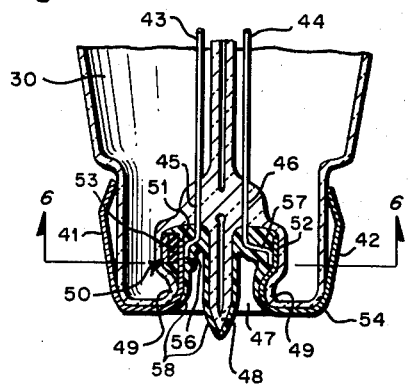
FIG. 5 is a fragmentary section showing the lower portion of a second principal form of lamp in accordance with this invention.
Figure 6:
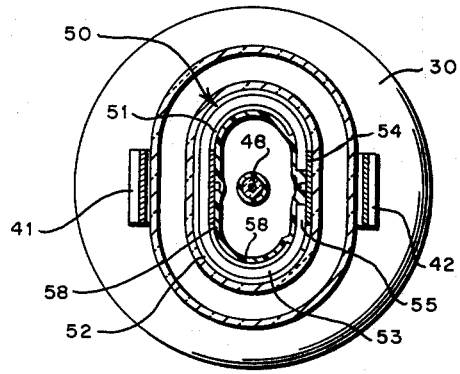
FIG. 6 is a sectional view along 6—6 of FIG. 5.

Referring now to FIGS. 5 and 6, there is shown a construction for a lamp 30 terminating in contacts 41, 42, generally similar to those shown 21, 22 in the prior embodiment. It will be noted that the contour of the base portion is that of a modified ellipse, with the contacts 41, 42 oppositely disposed across the narrow portion of the ellipse. Since this invention does not require that the lamp be rotated for full and proper insertion and contact with the receptacle, it is enabled to take advantage of elliptical, oblong and other configurations of lamp bases, instead of being restricted to cylindrical types.

The filament support leads 43, 44 project, again by glass-to-wire seals 45, 46, through the lower end of the lamp 30 into a cavity 47 containing the tipoff tube 48 at its axis and having a slightly constricted mouth portion 49, which serves as a retainer for connection strip 50. Connection strip 50 is, in this case, a tri-laminate which serves several purposes. It comprises two metallic-member conductors 51, 52 separated by insulating strip 53. In FIG. 6 it will be seen that the conductors 51, 52 are interrupted at one end short of meeting contact strip 54, which is integral with the other end of conductor 51 and with contact 42.

Thus, the trilaminate connection strip 50, which is springy, is split at this point for insertion into the cavity 47, the insulating strip 53 having a tongue 55 which lies against contact strip 54. The lower ends 56, 57 of filament-support leads 43, 44 are welded respectively to conductors 51, 52. After assembly, the cavity is sprayed with a coating 58, preferably of a hardenable plastic, with locks and insulates all components in cavity 47 against accidental disengagement through rough usage.

Figure 7:
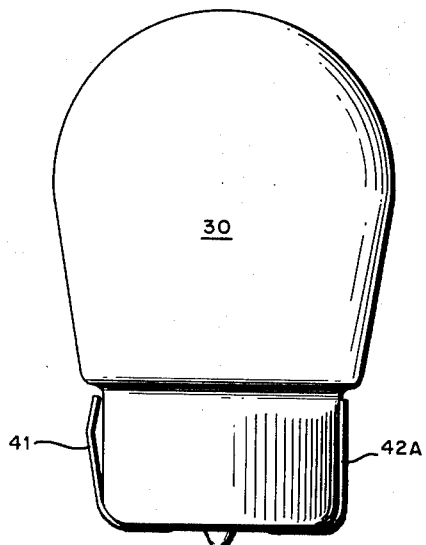
FIG. 7 is an elevation of the lamp of FIGS. 5 and 6, except that one contact is modified.

An alternative straight-sided contact 42A is shown at the right in FIG. 7. As with the prior-described metallic member 17 in FIG. 1A, the use of a straight-sided non-flexing metallic member 42A shifts the whole burden of contact compliance and elastic retention to the single flexing member 41.

Figure 8:
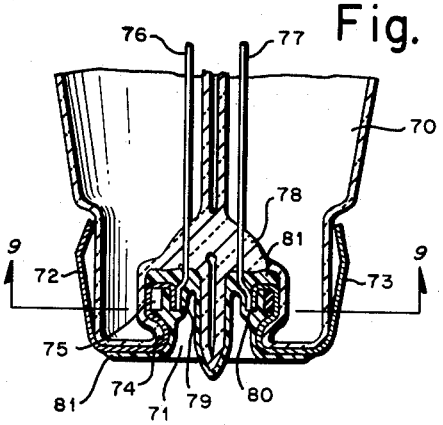
FIG. 8 is a fragmentary section showing the lower portion of a third principal form of this lamp.
Figure 9:
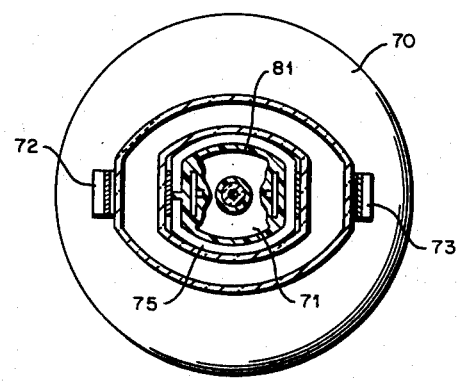
FIG. 9 is a sectional view along 9—9 of FIG. 8.
Figure 10:
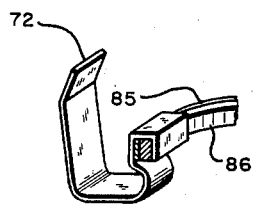
FIG. 10 is a fragmentary view showing one of the contacts from FIGS. 8 and 9, with an alternative locking means.

Referring now to FIGS. 8, 9, and 10, there is shown a third principal form of this invention, in which another cavity 71, likewise recessed into the underside of a bulb 70, affords room and capability to anchor both contact elements or metallic members 72, 73, which are identical to each other. These elements are essentially a form of spring clip. Individually they are adapted to slip over and onto the rim 74 of the cavity 71, which rim 74 is preferably slightly turned inward into the cavity. Next, an insulating ring 75, which may be split if desired, is slipped inside the cavity 71. Leads 76, 77, entering the press 78, pass out through the bottom of bulb 70 and into the cavity 71, where each is respectively spot-welded 79, 80 to one of the metallic-member contact elements 72, 73 at the lower inboard end thereof. Then the bulb preferably passes a spray station where a liberal coat 81, preferably of self-hardening plastic, such as a freshly-mixed, two-component epoxy, is applied to the cavity to lock all parts permanently in place.

Alternatively, the ring 75 need not be split, but, if of a plastic which will accept distortion or of a paper laminate, may be inserted by first temporarily distorting it and expanding it in situ into its normal configuration. Again alternatively, the ring 85 shown in FIG. 10 is a thin split or distorted ring, no thicker than the constriction of the rim. It is spread outwardly against the side walls of the cavity zone 71, and locked in place when a second, smaller-diameter ring 86 is inserted adhesively therewithin as an expansion plug therefor.

Unlike those in the prior embodiment, the metallic-member contact elements 72, 73 are disposed oppositely at the ends of the long axis of the modified elliptical base of FIGS. 8 and 9. As in other embodiments, the base could take the form of conventional art as a circle, but I prefer, where small or narrow contacts are to enter a receptacle in registry with mating contacts therein to key the base configuration of the lamp. Therefore, bases having unequal principal transverse dimensions or axes, such as oblongs and ellipses or diamonds, are to be preferred. These afford distinct advantages in safety, convenience of handling and use, ruggedness, and low cost over other methods of indexing lamps into receptacles.

Figure 11:
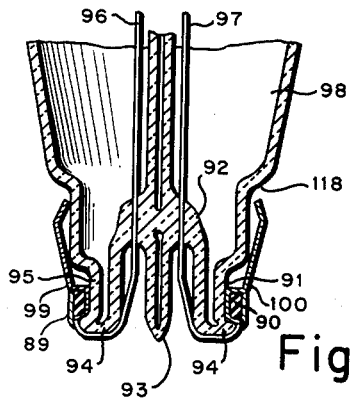
FIG. 11 is a fragmentary sectional view showing the lower portion of a fourth principal form of this lamp.
Figure 12:
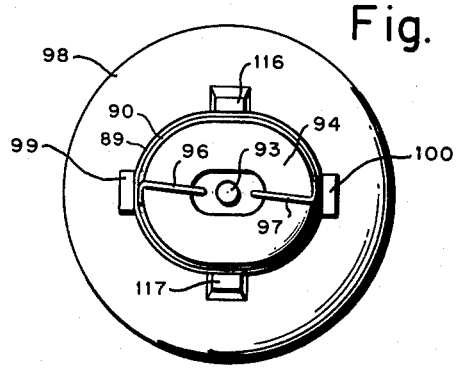
FIG. 12 is a partial view from below of the lamp of FIG. 11.

Referring now to FIGS. 11 and 12, it will be seen that the lower end of the bulb 98 of this lamp differs from prior embodiments in the location of cavity zone 91. Contacts or metallic members 99, 100 are each single clips. They are trapped under plastic ring 90 which has preferably been solvent-softened and stretched before it is slipped over rim 94 into the circumferential cavity 91. It is then dried and shrunk in place preferably by radiation and/or conduction of heat; thus it holds contacts 99, 100 tightly and permanently against the wall of the cavity zone 91. Optionally then, a separately applied hardening tape 89, freshly dipped in hardening adhesive may be used to lock all parts in place even more securely. A metallic lock ring of wire could be used over plastic ring 90; but the use of metal, which might occasionally cause short-circuiting, seems less desirable. Use is again made of ellipticity in the shaping of the base for greater positiveness and safety of indexing, as well as other advantages.

The flutes 116, 117 in FIG. 12 have been molded outwardly to serve as optional insertion stops in place of surface 118. Flutes may be preferable when it is not advantageous to utilize a change in circumferential size as a stop.

Referring now to FIG. 13, again in connection with the bulb 98 only of FIGS. 11 and 12, a section is shown of an alternative contact assembly for use with the same bulb 98. This contact assembly comprises split ring metallic-member contacts 101, 102, each projecting integrally at one end of the long diameter from its respective ring portion 103, 104. The split rings are adhesively laminated to the top and bottom surfaces respectively of an insulating split ring 105.

Figure 13:
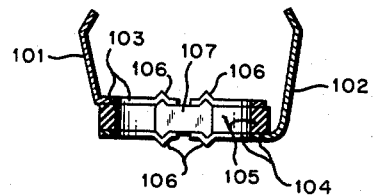
FIG. 13 is a sectional view of a contact arrangement for alternative combination with the bulb of FIGS. 11 and 12 to make a fifth principal lamp form.

At the point of split of the rings 103, 104, 105 in FIG. 13, it will be seen that the insulating split ring 105 falls farther short of meeting itself than do the metal split rings 103, 104 and that these metal rings have been slightly joggled 106, 106, etc., near each of their termini in order that they may accept insulating joiner 107 which, when the contact assembly has been put in place in the cavity 91 of the bulb 98, will lock the ends. To accommodate the assembly of FIG. 13, the cavity of FIG. 11 would be adjusted in width to restrain the joggled 106, 106 ends from spreading apart.

Assembly is completed in the same manner as in FIGS. 11 and 12 by spotwelding leads 96, 97 separately against the respective undersurfaces of the contacts, and a spray, tape or plastic strip may be used to enhance the security of the assembled lamp.

Figure 14:
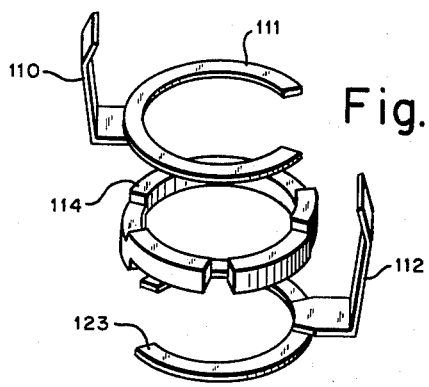
FIG. 14 is an exploded view of a contact arrangement for alternative combination with the bulb of FIGS. 11 and 12 to make a sixth principal lamp form.

Referring now to FIG. 14, an exploded view of a contact arrangement is seen. This arrangement is again an alternative for use with the bulb 98 of FIGS. 11 and 12. Contact arm 110 has been brazed or welded to elliptically bent split ring 111, which may be of circular, square, or oblong cross section, but is preferably as shown, and of a spring temper. Contact arm 112, which is slightly longer in its vertical dimension than contact arm 110, has been similarly secured to identical split ring 113. Insulating split ring 114 is adapted to fit neatly between rings 111 and 113 when in place in width-adjusted groove 91 of bulb 98 from FIGS. 11 and 12. Leads 96, 97 may be welded or soldered to contact arms or metallic members 110, 112 near their junctions with their respective split rings, as was done in the prior embodiments. Again the durability of the assembly in rough service would be maximized with a wrap or a hardening coating such as 89 in FIGS. 11 and 12.

Figure 16:
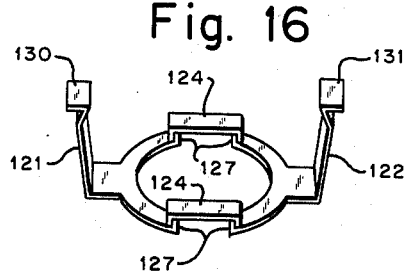
FIG. 16 is a pictorial view of a contact arrangement to fit the bulb of FIG. 15.
Figure 15:
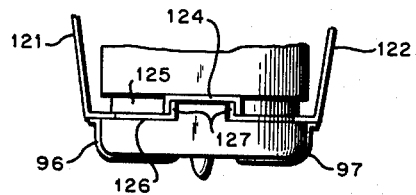
FIG. 15 is a fragmentary view of a bulb base for a seventh principal lamp form.

Referring now to the seventh principal embodiment of my invention shown in FIGS. 15 and 16, the cavity 125 in FIG. 15, unlike that shown hereinbefore, is stepped for the purpose of accepting insulating connectors 124, 124 and mutually interlocking them with contact arms 121, 122 by their cooperatively hooked ends 127. The groove-type cavity 125 may be additionally stepped to render it even more closely conforming; however, it may be well anyway to coat the cavity and the parts therein contained with a hardening material to lock them most firmly in place. The numerals 96, 97 refer to extensions of internal leads similar to those numbered previously in FIGS. 11 and 12, which leads are part of the external metallic-member array and are spotwelded to the undersides of metallic member contacts 121, 122 in a manner again similar to the prior showing 99, 100 in FIGS. 11 and 12.

Alternative projections, such as 130, 131 on contact arms or metallic member 121, 122 in FIG. 16, may be used when the bulb does not itself have a built-in stop surface and where it is desired that the contact arms also embody the stop means. When contact arms or metallic members 121, 122 are fitted with such projections as 130, 131, they will not pass beyond contact with current-carrying members in the receptacle.

As will have been observed, all of the general types of construction shown hereinabove will work with bases of circular or any other reasonable shape. However, such configurations as those shown are preferred for maximum safety and convenience in installation. The choice of one form in a particular embodiment does not necessarily exclude the substitution of another. However, the forms are not equivalents and will have preferential aspects relative to each other.

Figure 17:
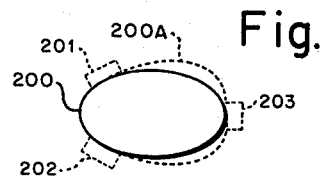
FIG. 17 is a sketch showing a scheme for polarizing the bases of several forms.

An easy method of reconfiguring the lamp of FIGS. 1, 2, 3, and 4 to change the symmetry of the base in order to polarize it was shown in FIG. 1B above in which the parallelism of the long sides of the base press was removed. Similarly, with respect to the elliptical base forms, any of them may be polarized by altering the shape of the ellipse, for example, as shown by the dotted line 200A in FIG. 17.

Polarization may be particularly desirable for certain kinds of lamps other than those employing simple resistive filaments, such as arc or gas-discharge types to be powered by direct current. Polarized bases are of especial interest for multi-filament lamps. The positioning in FIG. 17 of the dotted-line contacts 201, 202, 203 indicates one of the feasible polarized arrangements that may be made under this invention. Note that there is an absence of the crowding that causes malfunction due to mis-alignment of multi-filament lamps having Edison or bayonet bases. Other simple polarizing forms that do not depart from the scope of this invention will become apparent to those versed in the art.

It will be obvious that various combinations of features that I have shown can be made and that the principles can be combined with features and ideas already known in the art. Such modifications and combinations will be obvious to those skilled in the art without departing from the true scope of my invention; and it is, accordingly, intended in the appended claims to cover such equivalents as may fall within the true scope of my invention and without the prior art. I wish it to be understood that my invention is not to be limited to the specific forms or arrangements of parts which I have shown or described or specifically covered by claims.

Therefore, I claim:
1. An electric lamp comprising:
   a radiant energy producing device;
   a hermetically sealed radiant energy transmitting enclosure containing said device and having an axis therethrough;
   an integral base below said enclosure generally coaxial with said axis;
   a plurality of electrical leads for said device, said leads extending from said device to said base, thence through the wall thereof, and emerging at respective points near the remote end of said base via glass-metal seals;
   a plurality of metallic members, each of said members being individually electrically continuous with a respective one of said leads;
   each of said members retroverting generally upward from the said points, alongside said wall and generally in the direction of said axis;
   each of the said members having a contact area thereon included;
   said contact area being located radially opposite and facing outwardly of said wall of said base;
   at least one of said areas being located in a resiliently movable portion of the member including said area;
   said portion diverging slightly away from said wall and leaving a small clearance space therebetween behind said contact area, said portion again converging at least in part thereabove;
   said portion being adapted to yield elastically inwardly and thereby to spring said contact area toward said wall and to narrow said space when said area is forcibly constricted by progressive entry within the boundary of a non-circular opening in an extraneous receptacle;
   said base, together with said members, having a non-circular overall cross-sectional outline perpendicular to said axis;
   whereby said lamp must first be rotationally indexed into alignment of said outline generally with said opening before passing axially thereinto, and said lamp will resist accidental withdrawal from said receptacle after the most divergent part of said contact area has entered said opening past the point of maximum forcible constriction by said boundary, the required amount of resilient coacting compliance between said lamp and said receptacle residing in said lamp.

2. An electric lamp as in claim 1, said contact areas being aligned on opposite sides of said axis.

3. An electric lamp as in claim 1, a plurality of said contact areas being located in resilient portions of the said members including said contact areas respectively.

4. An electric lamp as in claim 1, said resilient portion having a modification therealong in cross-sectional dimension from a relatively large cross-section to a relatively small cross-section, whereby the section modulus thereof is reduced.

5. An electric lamp as in claim 1, said resilient portion having a modification therealong in material from a material of relatively great stiffness to a material of relatively small stiffness comprising a change in the Young's modulus thereof.

6. An electric lamp as in claim 1, said resilient portion being integral with said leads.

7. An electric lamp as in claim 1, said wall having integral guide projections thereon adjacent said members, whereby the possibility of misalignment of said contact areas is reduced.

8. An electric lamp as in claim 1, said base having a cavity zone formed therein, said metallic members being insulatively separated from each other and having portions thereof retained within said cavity zone.

9. An electric lamp as in claim 8, said cavity zone having a stepped configuration to improve the locking capability thereof.

10. An electric lamp as in claim 8, said metallic members being locked in said cavity zone by the application thereto of a hardenable fluid.

11. An electric lamp as in claim 8, said metallic members being locked in said cavity zone by an insulative retainer.

12. An electric lamp as in claim 11, said insulative retainer being under stress and exerting significant force against said lamp in said cavity zone.

13. An electric lamp as in claim 11, said insulative retainer being adhesively installed.

14. An electric lamp as in claim 1, said lamp having an insertion stop means, whereby said contact area may not be admitted into said receptacle beyond the limits of electrical continuity with a mating contact on the boundary of said opening.

15. An electric lamp as in claim 14, said enclosure having an outer wall, said stop means consisting of a projection of said outer wall farther from the said axis of said enclosure than that portion of aforesaid wall of said base immediately therebelow.

16. An electric lamp as in claim 14, at least one of said metallic members having a projection extending laterally outward therefrom, the amount of such lateral extension being sufficient to prevent the said member from passing through said receptacle beyond contact with said mating contact, whereby said projection serves as an insertion stop.

References Cited by the Examiner

UNITED STATES PATENTS

| | | | |
|---|---|---|---|
| 870,341 | 11/07 | Boehm | 339—176 X |
| 1,022,912 | 4/12 | Winston | 339—150 |
| 1,828,276 | 10/31 | Beers | 339—17 X |
| 2,053,138 | 9/36 | Donovan | 339—144 |
| 2,516,148 | 7/50 | Rose et al. | 339—176 X |
| 2,855,579 | 10/58 | Wintriss | 339—192 |
| 2,999,180 | 9/61 | Howles et al. | 313—318 |
| 3,016,727 | 1/62 | Vanden Boom et al. | 339—144 X |
| 3,056,941 | 10/62 | Eriksson | 339—145 X |

FOREIGN PATENTS 750,096   6/56   Great Britain.

JOSEPH D. SEERS, *Primary Examiner.*

DONLEY J. STOCKING, *Examiner.*